United States Patent
Sawhney

(10) Patent No.: US 10,733,159 B2
(45) Date of Patent: Aug. 4, 2020

(54) MAINTAINING IMMUTABLE DATA AND MUTABLE METADATA IN A STORAGE SYSTEM

(71) Applicant: Oracle International Corporation, Redwood Shores, CA (US)

(72) Inventor: Aditya Sawhney, Erie, CO (US)

(73) Assignee: Oracle International Corporation, Redwood Shores, CA (US)

( * ) Notice: Subject to any disclaimer, the term of this patent is extended or adjusted under 35 U.S.C. 154(b) by 65 days.

(21) Appl. No.: 15/369,221

(22) Filed: Dec. 5, 2016

(65) Prior Publication Data

US 2018/0075076 A1 Mar. 15, 2018

Related U.S. Application Data

(60) Provisional application No. 62/394,381, filed on Sep. 14, 2016.

(51) Int. Cl.
*G06F 16/21* (2019.01)

(52) U.S. Cl.
CPC .................. *G06F 16/219* (2019.01)

(58) Field of Classification Search
CPC ......... G06F 17/30227; G06F 17/30958; G06F 17/30073; G06F 16/245; G06F 21/52; G06F 16/219
USPC .......... 707/694, 634, 791, 698, 812
See application file for complete search history.

(56) References Cited

U.S. PATENT DOCUMENTS

| | | |
|---|---|---|
| 5,544,347 A | 8/1996 | Yanai et al. |
| 5,657,453 A | 8/1997 | Taoka et al. |
| 6,108,748 A | 8/2000 | Ofek et al. |
| 6,157,612 A | 12/2000 | Weerackody et al. |
| 6,460,052 B1 | 10/2002 | Thomas et al. |
| 6,714,553 B1 | 3/2004 | Poole et al. |
| 7,035,971 B1 | 4/2006 | Merchant |
| 7,245,624 B2 | 7/2007 | Kramer et al. |
| 7,263,593 B2 | 8/2007 | Honda et al. |
| 7,707,151 B1 | 4/2010 | Blumenau et al. |

(Continued)

FOREIGN PATENT DOCUMENTS

| | | |
|---|---|---|
| JP | 3208236 B2 | 9/2001 |
| KR | 10-2015-0088531 A | 8/2015 |

OTHER PUBLICATIONS

Silberschatz et al. "Operating System Concepts, 8th Edition". John Wiley & Sons. Jul. 29, 2008. ISBN-13:978-0-470-12872-5. Accessed Aug. 2019. (Year: 2008).

*Primary Examiner* — Mariela Reyes
*Assistant Examiner* — Courtney Harmon
(74) *Attorney, Agent, or Firm* — Invoke

(57) ABSTRACT

Techniques for maintaining immutable data and mutable metadata in a storage system are disclosed. Each object is associated with one or more data records and one or more metadata records. Responsive to a request to modify the data of an object, a new data record and a new metadata record are generated for the object. The new data record stores the new data of the object. The new metadata record stores the new metadata corresponding to the new data of the object. Responsive to a request to modify the metadata of an object, an existing metadata record of the object is identified. The existing metadata record is overwritten with the new metadata of the object. No new data records or metadata records are generated.

20 Claims, 8 Drawing Sheets

(56) References Cited

U.S. PATENT DOCUMENTS

| | | |
|---|---|---|
| 8,484,162 B2 | 7/2013 | Prahlad et al. |
| 8,521,973 B2 | 8/2013 | Rowan et al. |
| 8,627,319 B1 | 1/2014 | Xu |
| 8,645,737 B2 | 2/2014 | Saika |
| 8,973,034 B1 | 3/2015 | Harvey et al. |
| 9,037,538 B2 | 5/2015 | Sampathkumar |
| 9,396,287 B1 | 7/2016 | Bhave et al. |
| 9,501,507 B1 | 11/2016 | Harris et al. |
| 9,507,843 B1 * | 11/2016 | Madhavarapu ..... G06F 16/2358 |
| 9,524,302 B2 * | 12/2016 | Regni ............... G06F 17/30227 |
| 9,547,459 B1 | 1/2017 | Benhanokh et al. |
| 9,720,989 B2 | 8/2017 | Theimer et al. |
| 9,740,565 B1 | 8/2017 | Mitra et al. |
| 9,798,754 B1 | 10/2017 | Shilane et al. |
| 9,811,529 B1 | 11/2017 | Rus et al. |
| 9,846,655 B1 | 12/2017 | Zhao et al. |
| 9,864,774 B2 * | 1/2018 | Marcotte ........... G06F 17/30377 |
| 10,229,150 B2 | 3/2019 | Marquardt et al. |
| 10,346,360 B1 | 7/2019 | Basov |
| 2001/0016843 A1 * | 8/2001 | Olson ............... G06F 17/30424 |
| 2002/0143494 A1 | 10/2002 | Conrad |
| 2004/0153458 A1 * | 8/2004 | Noble ................. G06F 11/1464 |
| 2005/0049945 A1 | 3/2005 | Bourbonnais et al. |
| 2005/0131964 A1 | 6/2005 | Saxena |
| 2006/0072400 A1 | 4/2006 | Anderson et al. |
| 2006/0095481 A1 | 5/2006 | Singh et al. |
| 2006/0106825 A1 | 5/2006 | Cozzi |
| 2006/0218558 A1 | 9/2006 | Torii et al. |
| 2006/0271420 A1 | 11/2006 | Anselmann et al. |
| 2007/0043790 A1 | 2/2007 | Kryger |
| 2007/0192229 A1 * | 8/2007 | Rowan .................. G06Q 30/02 705/37 |
| 2007/0239944 A1 | 10/2007 | Rupanagunta et al. |
| 2009/0059017 A1 | 3/2009 | Kurokawa |
| 2010/0049938 A1 | 2/2010 | Izumi et al. |
| 2010/0205160 A1 * | 8/2010 | Kumar .............. G06F 17/30613 707/696 |
| 2010/0257995 A1 | 10/2010 | Kamiya |
| 2010/0322475 A1 | 12/2010 | Ikeda |
| 2011/0013631 A1 | 1/2011 | Frydman et al. |
| 2011/0016353 A1 | 1/2011 | Mikesell et al. |
| 2011/0119100 A1 | 5/2011 | Ruhl et al. |
| 2011/0164614 A1 | 7/2011 | Begeja |
| 2011/0196900 A1 * | 8/2011 | Drobychev ....... G06F 17/30575 707/812 |
| 2011/0246429 A1 | 10/2011 | Prahlad et al. |
| 2011/0298520 A1 | 12/2011 | Masson |
| 2012/0072412 A1 | 3/2012 | Bestgen et al. |
| 2012/0191724 A1 | 7/2012 | Tucek et al. |
| 2012/0254116 A1 | 10/2012 | Thereska et al. |
| 2012/0259863 A1 | 10/2012 | Bodwin et al. |
| 2012/0311586 A1 | 12/2012 | Inagaki |
| 2013/0290249 A1 | 10/2013 | Merriman et al. |
| 2013/0311422 A1 | 11/2013 | Walker et al. |
| 2013/0311555 A1 | 11/2013 | Laoutaris et al. |
| 2013/0326055 A1 | 12/2013 | Chatterjee et al. |
| 2014/0040199 A1 | 2/2014 | Golab et al. |
| 2014/0122022 A1 | 5/2014 | Chen et al. |
| 2014/0180461 A1 | 6/2014 | Heck et al. |
| 2014/0188868 A1 | 7/2014 | Hunter et al. |
| 2014/0189270 A1 | 7/2014 | Iwanicki et al. |
| 2014/0207820 A1 | 7/2014 | Lee |
| 2014/0250281 A1 | 9/2014 | Rao et al. |
| 2014/0280986 A1 | 9/2014 | Baulier et al. |
| 2015/0112836 A1 * | 4/2015 | Godsey .............. G06Q 30/0613 705/26.41 |
| 2015/0220558 A1 | 8/2015 | Snibbe et al. |
| 2015/0234897 A1 | 8/2015 | Kuninobu et al. |
| 2015/0278092 A1 | 10/2015 | Smentek et al. |
| 2015/0302432 A1 | 10/2015 | Chien et al. |
| 2015/0339314 A1 * | 11/2015 | Collins ............. G06F 17/30153 707/627 |
| 2015/0355824 A1 | 12/2015 | Ueno |
| 2015/0363271 A1 | 12/2015 | Haustein et al. |
| 2015/0370505 A1 | 12/2015 | Shuma et al. |
| 2016/0006673 A1 | 1/2016 | Thomas et al. |
| 2016/0026409 A1 | 1/2016 | Tanaka et al. |
| 2016/0105370 A1 | 4/2016 | Mellor et al. |
| 2016/0202693 A1 | 7/2016 | Noda et al. |
| 2016/0255139 A1 | 9/2016 | Rathod |
| 2016/0275150 A1 | 9/2016 | Bournonnais et al. |
| 2016/0306822 A1 | 10/2016 | Waghulde |
| 2016/0335550 A1 | 11/2016 | Achin et al. |
| 2016/0342486 A1 | 11/2016 | Kedem et al. |
| 2017/0052717 A1 | 2/2017 | Rawat et al. |
| 2017/0351543 A1 * | 12/2017 | Kimura ............. G06F 17/30949 |
| 2017/0371887 A1 | 12/2017 | Balasubramanian et al. |
| 2018/0075069 A1 | 3/2018 | Guim et al. |

* cited by examiner

MAINTAINING IMMUTABLE DATA AND MUTABLE METADATA IN A STORAGE SYSTEM

BENEFIT CLAIMS; INCORPORATION BY REFERENCE

This application claims the benefit of U.S. Provisional Patent Application No. 62/394,381, filed Sep. 14, 2016, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to objects stored in a storage system. In particular, the present disclosure relates to maintaining immutable data and mutable metadata in a storage system.

BACKGROUND

Storage systems store objects according to various corresponding storage architectures. Examples of storage architectures include an object storage, a file system, a block storage, and/or a database.

Each object is associated with data and metadata. Data (also referred to herein as "object data") includes, for example, information that is used by an end user and/or a business application. As an example, data for a Sales Application may include information about customers, products, and sales. As another example, data for a Human Resources Application may include information about employees, departments, and salaries. Metadata describes how the data is set up and/or stored. Additionally or alternatively, metadata describes characteristics about the data itself. Metadata may be used to manipulate and/or manage the objects in a storage system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. STORAGE SYSTEM ARCHITECTURE
3. MAINTAINING IMMUTABLE DATA AND MUTABLE METADATA, ASSOCIATED WITH ONE OR MORE OBJECTS, IN A STORAGE SYSTEM
4. EXAMPLE EMBODIMENTS
5. MISCELLANEOUS; EXTENSIONS
6. HARDWARE OVERVIEW

1. GENERAL OVERVIEW

One or more embodiments include maintaining immutable data and mutable metadata for objects stored in a storage system. The storage system includes two tiers: a data tier and a metadata tier. The data tier includes immutable data records. The metadata tier includes mutable metadata records. When the storage system receives a request to modify an object, a determination is made as to whether the request is for a modification of the data or the metadata corresponding to the object. If the request is to modify the data, then a new data record and a new metadata record are generated. The new data record stores the new data of the object. The new metadata record stores the new metadata of the object. Meanwhile, any existing data records and metadata records associated with the object remain unchanged. Conversely, if the request is to modify the metadata, then an existing metadata record for the object is identified. The new metadata, for the object, overwrites the existing metadata in the existing metadata record. No new data records or metadata records are generated.

One or more embodiments described in this Specification and/or recited in the claims may not be included in this General Overview section.

2. STORAGE SYSTEM ARCHITECTURE

Figure 1:
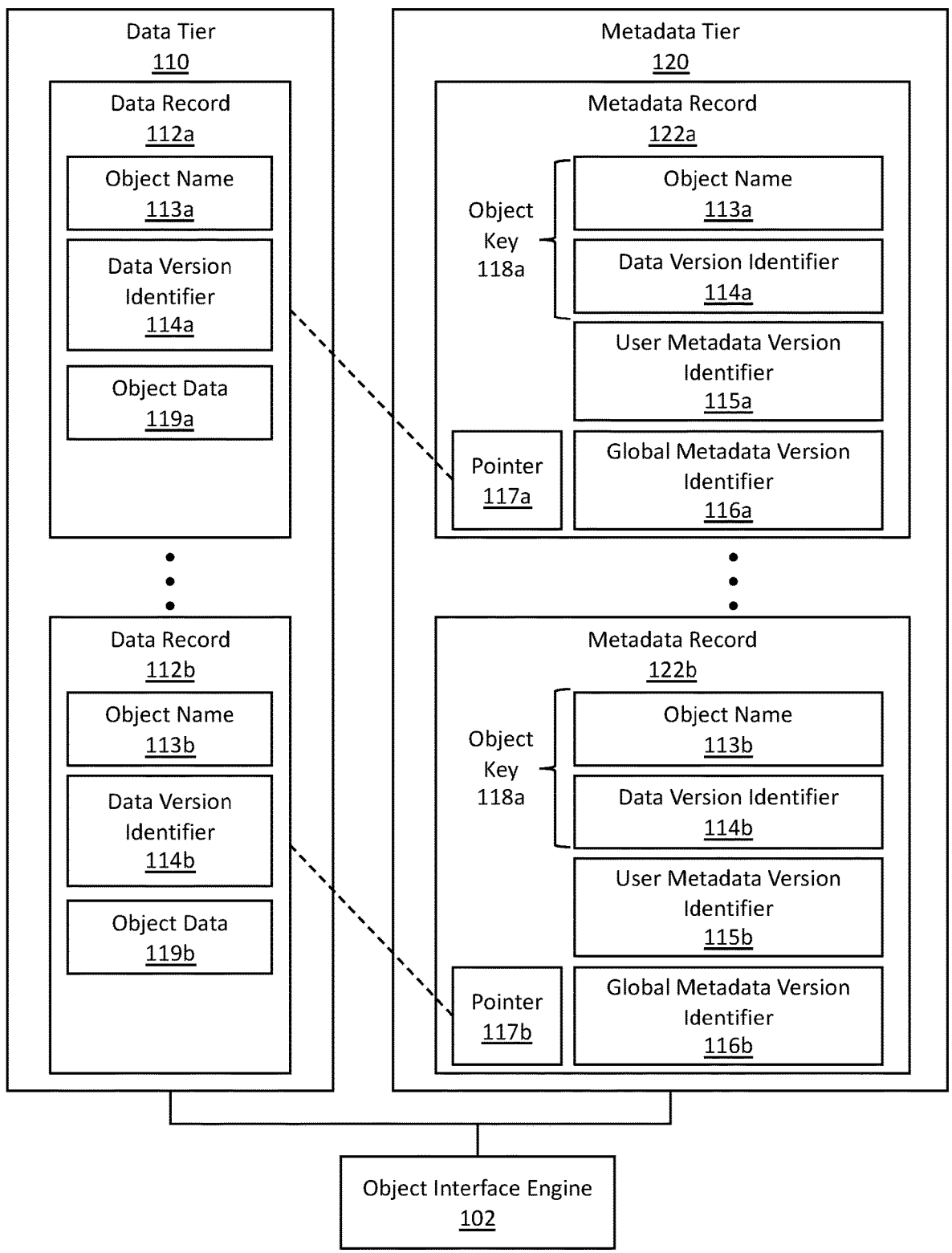
FIG. 1 illustrates a system, in accordance with one or more embodiments.

FIG. 1 illustrates a system 100 in accordance with one or more embodiments. As illustrated in FIG. 1, the system 100 includes a data tier 110, a metadata tier 120, and an object interface engine 102. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a data tier 110 refers to hardware and/or software configured to store object data associated with objects of a storage system. As illustrated, a data tier 110 includes one or more data records (such as data records 112a-b), each corresponding to a particular version of object data of an object. Each data record includes a set of object data (such as object data 119a-b), which is a version of object data of an object. Each time a new object is created, a new data record is generated for storing the data of the object. Each time the data of an object is changed, a new data record is generated for storing the new data of the object.

In one or more embodiments, a metadata tier 120 refers to hardware and/or software configured to store the metadata associated with objects of a storage system. As illustrated, a metadata tier 120 includes one or more metadata records (such as metadata records 122a-b). Each time a new object is created, a new metadata record is generated for storing the metadata of the object. Each time the data of an object is changed, a new metadata record is generated for storing the metadata associated with the new data of the object. Each time the metadata of an object is changed, the existing metadata record for the object is overwritten with new metadata. The metadata may change due to (a) user requests and/or (b) system requests. User requests may be received from a user via a user interface and/or application programming interface (API). System requests may be received from an application and/or a process. As an example, metadata associated with an object may include a flag indicating whether a transaction record of the object has been published. After publishing a particular transaction record, a publisher may request that the flag associated with the particular transaction record become marked. The request from the publisher is an example of a system request.

In one or more embodiments, a data record (such as data records 112a-b) is associated with an object name (such as object names 113a-b), and a data version identifier (such as data version identifiers 114a-b). Further, a metadata record (such as metadata records 122a-b) is associated with an object name (such as object names 113a-b), a data version identifier (such as data version identifiers 114a-b), a user metadata version identifier (such as user metadata version identifiers 115a-b), a global metadata version identifier (such as global metadata version identifiers 116a-b), and a pointer (such as pointers 117a-b). A user metadata version identifier and/or a global metadata version identifier may also be referred to as a "metadata version identifier."

A data record exists for each version of data associated with an object. Data records for different versions of object data corresponding to a same object are associated with a same object name but different data version identifiers. Similarly, a metadata record exists for each version of data associated with an object. A metadata record, for a particular version of data associated with an object, is associated with the same object name and the same data version identifier as the data record for the particular version of data associated with the object. A version of data associated with an object may be referred to herein as a "version of an object." Hence, a single data record and a single metadata record correspond to each version of an object. Further, there is a one-to-one mapping between data records and metadata records.

A data version identifier is an identifier of a particular version of object data associated with an object. Each new data record is associated with a new data version identifier.

A data version identifier may be represented in a particular format. In an embodiment, a data version identifier is an integer that is incremented for each new version of data associated with an object. In another embodiment, a data version identifier is associated with a time at which a data record is generated. The data version identifier comprises of one or more of the following components: an epoch, a physical time, and/or a logical time.

The physical time is derived from the clock of the system. The physical time indicates a time at which an event occurs. As an example, the physical time may indicate a time at which a data record is generated.

The epoch is a time period in which there is no significant change and/or adjustment in the clock of the system. The epoch is incremented every time the clock is changed and/or adjusted. As an example, one epoch may be designated for a time period in which a system clock is set according to Pacific Daylight Time. The epoch may be incremented when the system clock is set according to Pacific Standard Time. As another example, a current time may be Nov. 1, 2016, at 10:00 a.m. However, a clock of a system may be erroneously set to indicate that the current time is Nov. 1, 1916, at 10:00 a.m. An administrator may notice the error and adjust the clock to accurately reflect the current time. One epoch may be designated for the time period prior to the adjustment by the administrator. Another epoch may be designated for the time period subsequent to the adjustment by the administrator.

The logical time is used to identify an ordering of events that occur at the same physical time. As an example, Data Record A and Data Record B may be generated at the same physical time, "12:00:35." Data Record A may be associated with a logical time of "0." Data Record B may be associated with a logical time of "1." The logical time indicates that Data Record A was generated before Data Record B.

A user metadata version identifier is an identifier of a particular version of metadata corresponding to a particular version of object data of an object. The user metadata version identifier is updated every time the metadata is changed in response to a user request. A user metadata version identifier may be represented in a particular format. As an example, a user metadata version identifier may be represented as an integer. A newly generated metadata record may be associated with a user metadata version identifier of "0." The user metadata version identifier may be incremented by one on every user-initiated change to the metadata.

A global metadata version identifier is an identifier of a particular version of metadata corresponding to a particular version of object data of an object. The global metadata version identifier is updated every time the metadata is changed in response to a user request and/or a system request. The global metadata version identifier may be represented in a particular format. As an example, a global metadata version identifier may be associated with a time at which the metadata record is generated and/or changed. The global metadata version identifier may comprise: (a) an epoch, (b) a physical time, and (c) a logical time.

A pointer (such as pointers 117a-b), stored in a metadata record, is a reference to the corresponding data record. In an embodiment, the pointer is a Blob ID. The Blob ID may be generated by the storage system in which the data record is persisted.

An object key (such as object keys 118a-b) is a unique identifier used to identify a particular data record and/or a particular metadata record. The object key comprises the object name and the data version identifier. The object name and the data version identifier, stored in the data record, serves as a reference to the corresponding metadata record. In an embodiment, a request to retrieve a particular version of an object may be received. The object name and the data version identifier, specified within the request, are used to determine an object key. The object key is used to retrieve a metadata record corresponding to the particular version of the object. The pointer stored within the metadata record is used to retrieve a data record corresponding to the particular version of the object. The object data stored within the data record is returned in response to the request.

In one or more embodiments, the data tier 110 and/or the metadata tier 120 are implemented using one or more data repositories. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as an object interface engine 102. Alternatively or additionally, a data repository may be implemented or executed on a computing system separate from an object interface engine 102. A data repository may be communicatively coupled to an object interface engine 102 via a direct connection or via a network.

In one or more embodiments, an object interface engine 102 refers to hardware and/or software configured to perform operations described herein for maintaining immutable data and mutable metadata, associated with one or more objects, in a storage system. Examples of operations for maintaining immutable data and mutable metadata, associated with one or more objects, in a storage system are described below with reference to FIGS. 2-4.

In an embodiment, an object interface engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant ("PDA").

3. MAINTAINING IMMUTABLE DATA AND MUTABLE METADATA, ASSOCIATED WITH ONE OR MORE OBJECTS, IN A STORAGE SYSTEM

Figure 2:
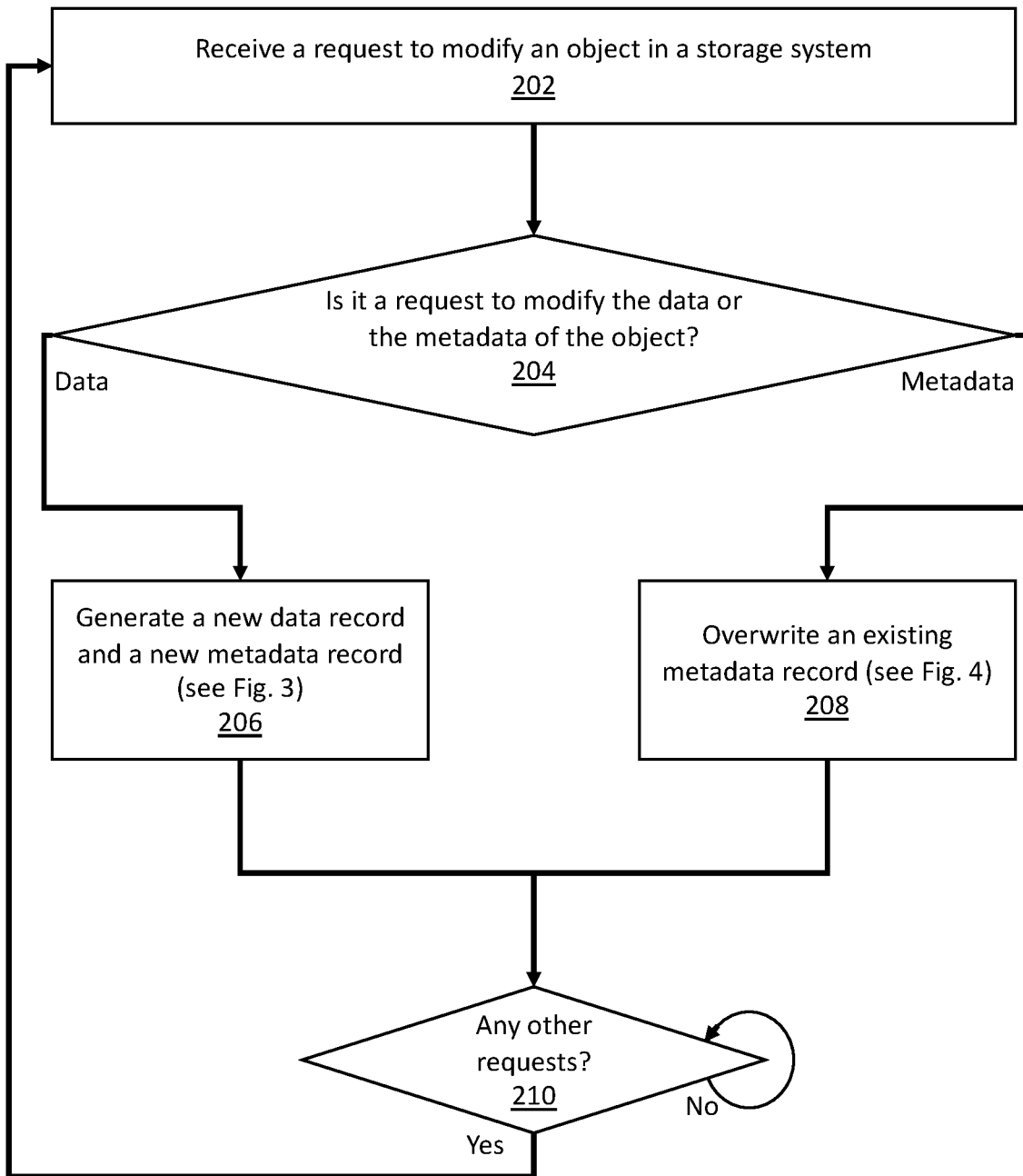
FIG. 2 illustrates an example set of operations for maintaining immutable data and mutable metadata, associated with one or more objects, in a storage system, in accordance with one or more embodiments.

FIG. 2 illustrates an example set of operations for maintaining immutable data and mutable metadata, associated with one or more objects, in a storage system, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include receiving a request to modify an object in a storage system (Operation 202). An object interface engine receives the request from a user and/or an application. The request may be received via an API. Additionally or alternatively, the request may be received via a user interface. The request includes an object name of the object being modified. The request to modify the object may be, for example, a request to create a new object in the storage system, or a request to change an existing object stored in the storage system.

One or more embodiments include determining whether the request is to modify the data or the metadata of the object (Operation 204). The object interface engine identifies a command specified within the request. The command indicates whether the request is to modify the data or the metadata. As an example, a "PUT" command may be a request to modify the data, while an "UPDATE" command may be a request to modify the metadata.

If the request is to modify the data, then the object interface engine generates a new data record and a new metadata record (Operation 206). Examples of operations for generating a new data record and a new metadata record are described below with reference to FIG. 3.

If the request is to modify the metadata, then the object interface engine overwrites an existing metadata record (Operation 208). Examples of operations for overwriting an existing metadata record are described below with reference to FIG. 4.

One or more embodiments include determining whether there are any other requests to modify an object in the storage system (Operation 210). If there is another request, then the object interface engine iterates Operations 202-210 with respect to the other request.

Figure 3:
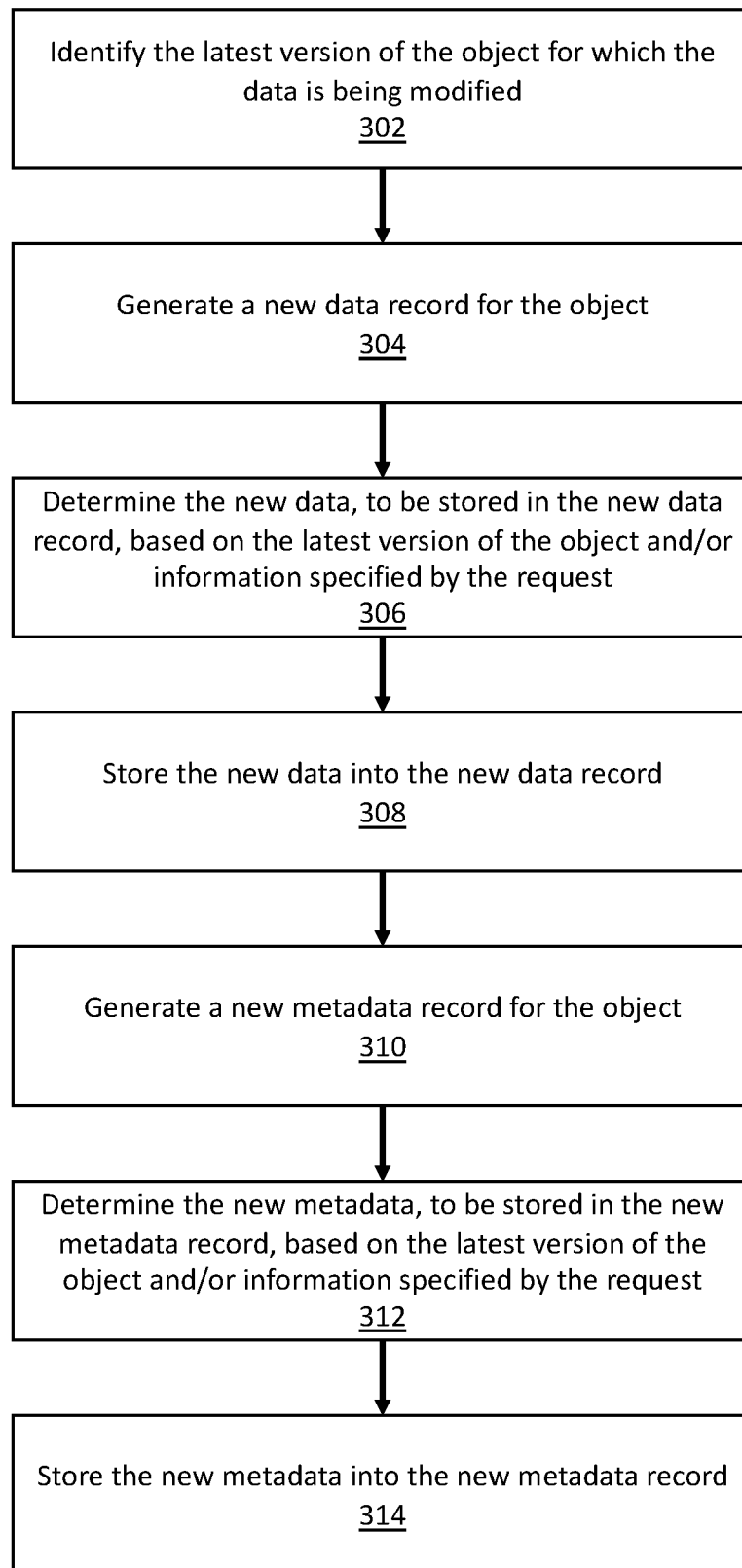
FIG. 3 illustrates an example set of operations for modifying the data of an object in response to a request to modify the data, in accordance with one or more embodiments.

FIG. 3 illustrates an example set of operations for modifying the data of an object in response to a request to modify the data, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments. The operations illustrated in FIG. 3 may be performed as part of Operation 206 of FIG. 2.

One or more embodiments include identifying the latest version of the object for which the data is being modified (Operation 302). An object interface engine identifies a set of one or more metadata records that includes the object name of the object. From the set of metadata records, the object interface engine identifies the metadata record of the latest version of the object. Various methods for identifying the metadata record of the latest version of the object may be used. The object interface engine may compare the data version identifiers included in each of the set of metadata records. Additionally or alternatively, the object interface engine may identify the metadata record of the latest version of the object from a list of metadata records associated with the object. The list of metadata records associated with the object may be maintained and stored in the metadata tier of the storage system. The metadata record of the latest version of the object may be referred to as a "current metadata record."

The object interface engine identifies a pointer to the corresponding data record from the current metadata record. The pointer references the data record of the latest version of the object. The data record of the latest version of the object may be referred to as a "current data record."

Additional and/or alternative methods for identifying a current metadata record and a current data record may be used.

In some embodiments, Operation 302 is not performed. As an example, Operation 302 is not performed if the request received at Operation 202 is a request to create a new object. In this case, there is no existing version of the object stored in the storage system.

One or more embodiments include generating a new data record for the object (Operation 304). The object interface engine determines an object name and a data version identifier to be included in the new data record.

Various methods for determining the object name to be stored in the new data record may be used. As described above with reference to Operation 202, the request to modify the object includes the object name of the object. The object interface engine may determine the object name to be stored in the new data record based on the request to modify the object.

Additionally or alternatively, the current data record includes the object name of the object being modified. The object interface engine may determine the object name to be stored in the new data record based on the current data record.

Various methods for determining the data version identifier to be stored in the new data record may be used. The object interface engine may determine the data version identifier to be stored in the new data record based on a time at which the modification to the object is being made. The object interface engine determines an epoch, a physical time, and a logical time corresponding to a time at which the modification to the object is being made. The data version identifier is a combination of the epoch, the physical time, and the logical time.

Additionally or alternatively, the object interface engine may determine a data version identifier to be stored in the new data record based on the current data record. As an example, an object interface engine may identify a data version identifier stored in the current data record. The object interface engine may obtain the data version identifier to be stored in the new data record by incrementing the data version identifier stored in the current data record.

One or more embodiments include determining the new data, to be stored in the new data record, based on the latest version of the object and/or information specified by the request (Operation 306).

The object interface engine may determine the new data to be stored based on information specified by the request to modify the object. The request to modify the object was received at Operation 202, as described above. The body of the request may include the new data to be stored.

Additionally or alternatively, the object interface engine may determine the new data to be stored based on the latest version of the object. As an example, a data record may include multiple fields for storing data. The request to modify the object may specify a change to the data associated with a particular field of the data record. Meanwhile, the data associated with the other fields is unchanged. The object interface engine may copy the data associated with the other fields from the current data record to the new data record. The new data may comprise: (a) the new data, associated with the particular field, specified by the request and (b) the data, associated with the other fields, copied from the current data record.

One or more embodiments include storing the new data into the new data record (Operation 308). The object interface engine stores the new data record in the data tier of the storage system. The new data record includes the new data determined at Operation 306. The new data record includes the data version identifier determined at Operation 304.

One or more embodiments include generating a new metadata record for the object (Operation 310).

The object interface engine determines an object name and a data version identifier to be included in the new metadata record. The same object name and data version identifier identified at Operation 304 are to be included in the new metadata record.

The object interface engine determines a user metadata version identifier and/or a global metadata version identifier to be included in the new metadata record. In an embodiment, the object interface engine determines the global metadata version identifier based on a time at which the modification to the object is being made. The object interface engine determines the user metadata version identifier by incrementing the user metadata version identifier stored in the current metadata record.

The object interface engine determines a pointer to be stored in the new metadata record. The pointer is a Blob ID, or another reference, to the new data record that was stored into the storage system at Operation 308.

One or more embodiments include determining the new metadata, to be stored in the new metadata record, based on the latest version of the object and/or information specified by the request (Operation 312).

The object interface engine may determine the new metadata to be stored based on information specified by the request to modify the object. The request to modify the object was received at Operation 202, as described above. The body of the request may include the new metadata to be stored. Additionally or alternatively, the request may include other metadata to be stored, such as an identifier of a user and/or application that initiated the request.

The object interface engine may determine the new metadata to be stored based on the latest version of the object. The object interface engine may copy metadata from the current metadata record to the new metadata record. As an example, the current metadata record may include an identifier of a user and/or application that first created the object. An object interface engine may copy the identifier of the user and/or application that first created the object to the new metadata record.

One or more embodiments include storing the new metadata into the new metadata record (Operation 314). The object interface engine stores the new metadata record in the metadata tier of the storage system. The new metadata record includes the new metadata determined at Operation 312. The new metadata record includes the user metadata version identifier and/or global metadata version identifier determined at Operation 310.

Figure 4:
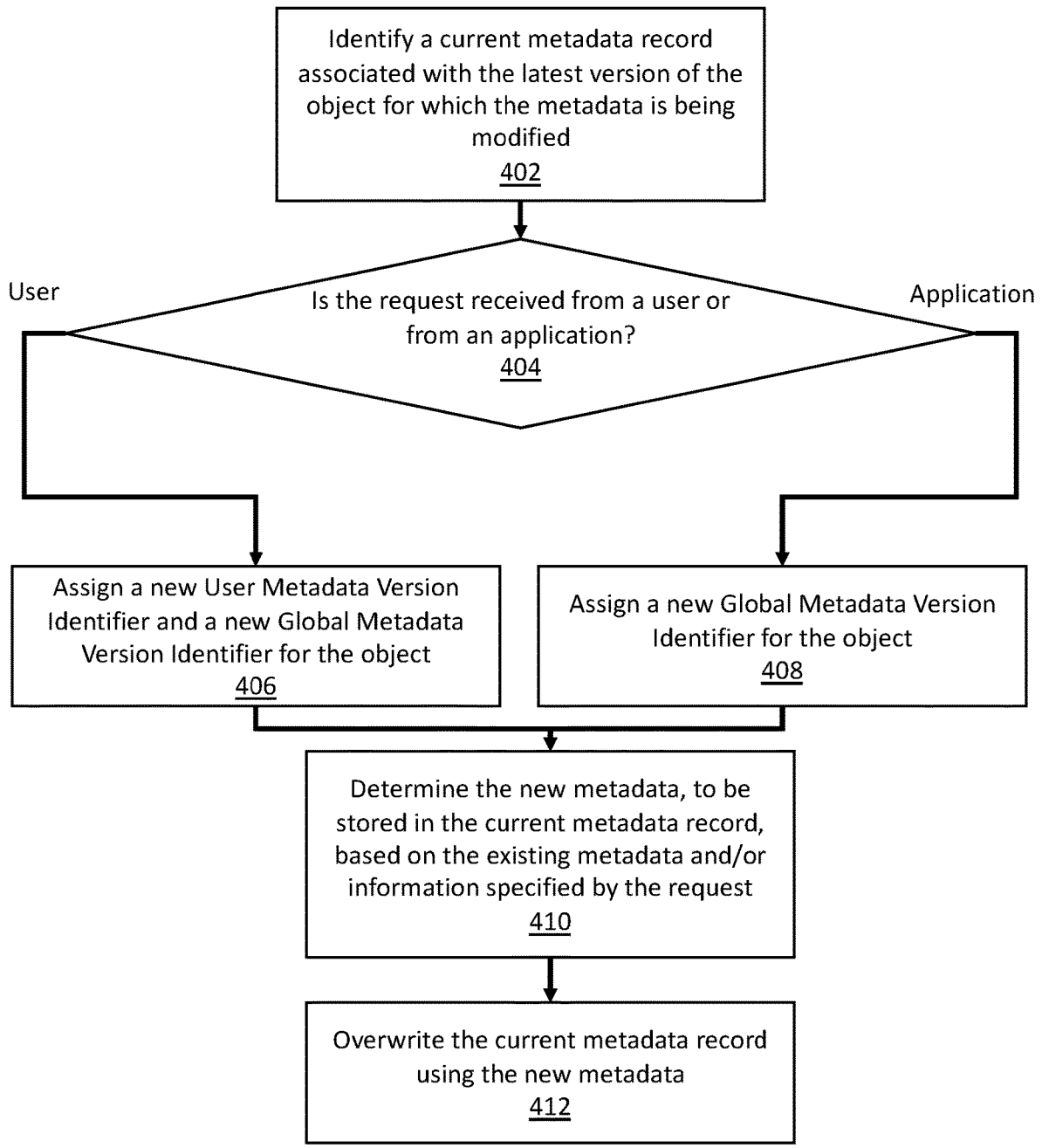
FIG. 4 illustrates an example set of operations for modifying the metadata of an object in response to a request to modify the metadata, in accordance with one or more embodiments.

FIG. 4 illustrates an example set of operations for modifying the metadata of an object in response to a request to modify the metadata, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments. The operations illustrated in FIG. 4 may be performed as part of Operation 208 of FIG. 2.

One or more embodiments include identifying a current metadata record associated with the latest version of the object for which the metadata is being modified (Operation 402). An object interface engine identifies a set of one or more metadata records that includes the object name of the object. From the set of metadata records, the object interface engine identifies the metadata record of the latest version of the object. Various methods for identifying the metadata record of the latest version of the object may be used. The object interface engine may compare the data version identifiers included in each of the set of metadata records. Additionally or alternatively, the object interface engine may identify the metadata record of the latest version of the object from a list of metadata records associated with the object. The list of metadata records associated with the object may be maintained and stored in the metadata tier of the storage system. The metadata record of the latest version of the object may be referred to as a "current metadata record."

One or more embodiments include determining whether the request was received from a user or from an application (Operation 404). The object interface engine may determine whether the request was received from a user or an application based on a tag associated with the request. The tag may indicate the source of the request.

Additionally or alternatively, the object interface engine may determine whether the request was received from a user or an application based on a source address of the request. A set of addresses may be associated with user requests. A different set of addresses may be associated with system requests. If the source address of the request matches one of the addresses associated with user requests, then the object interface engine determines that the request was received from a user. If the source address of the request matches one of the addresses associated with system requests, then the object interface engine determines that the request was received from an application.

Additional and/or alternative methods for determining whether the request was received from a user or an application may be used.

If the request was received from a user, one or more embodiments include assigning a new user metadata version identifier and a new global metadata version identifier for the object (Operation 406). In an embodiment, the object interface engine determines the global metadata version identifier based on a time at which the modification to the object is being made. The object interface engine determines the user metadata version identifier by incrementing the user metadata version identifier stored in the current metadata record.

Additional and/or alternative methods for determining a new user metadata version identifier and a new global metadata version identifier may be used.

If the request was received from an application, one or more embodiments include assigning a new global metadata version identifier for the object (Operation 408). The user metadata version identifier in the current metadata record remains unchanged.

In an embodiment, the object interface engine determines the global metadata version identifier based on a time at which the modification to the object is being made. Additional and/or alternative methods for determining a new global metadata version identifier may be used.

One or more embodiments include determining the new metadata, to be stored in the metadata record, based on the existing metadata in the current metadata record and/or information specified by the request (Operation 410).

The object interface engine may determine the new metadata to be stored based on information specified by the request to modify the object. The request to modify the object was received at Operation 202, as described above. The body of the request may include the new metadata to be stored. Additionally or alternatively, the request may include other metadata to be stored, such as an identifier of a user and/or application that initiated the request.

The object interface engine may determine the new metadata to be stored based on the existing metadata in the current metadata record. Metadata from the current metadata record may be retained in the new metadata. As an example, the current metadata record may include an identifier of a user and/or application that first created the object. The new metadata may continue to include the identifier of the user and/or application that first created the object.

One or more embodiments include overwriting the current metadata record using the new metadata (Operation 412). The object interface engine overwrites the current metadata record using the new metadata determined at Operation 410. No new metadata record is generated. Additionally, the data tier is not changed based on the request.

The current metadata record includes the new metadata determined at Operation 410. The current metadata record includes (a) the new user metadata version identifier and new global metadata version identifier determined at Operation 406 or (b) the new global metadata version identifier determined at Operation 408.

4. EXAMPLE EMBODIMENTS

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 5A:
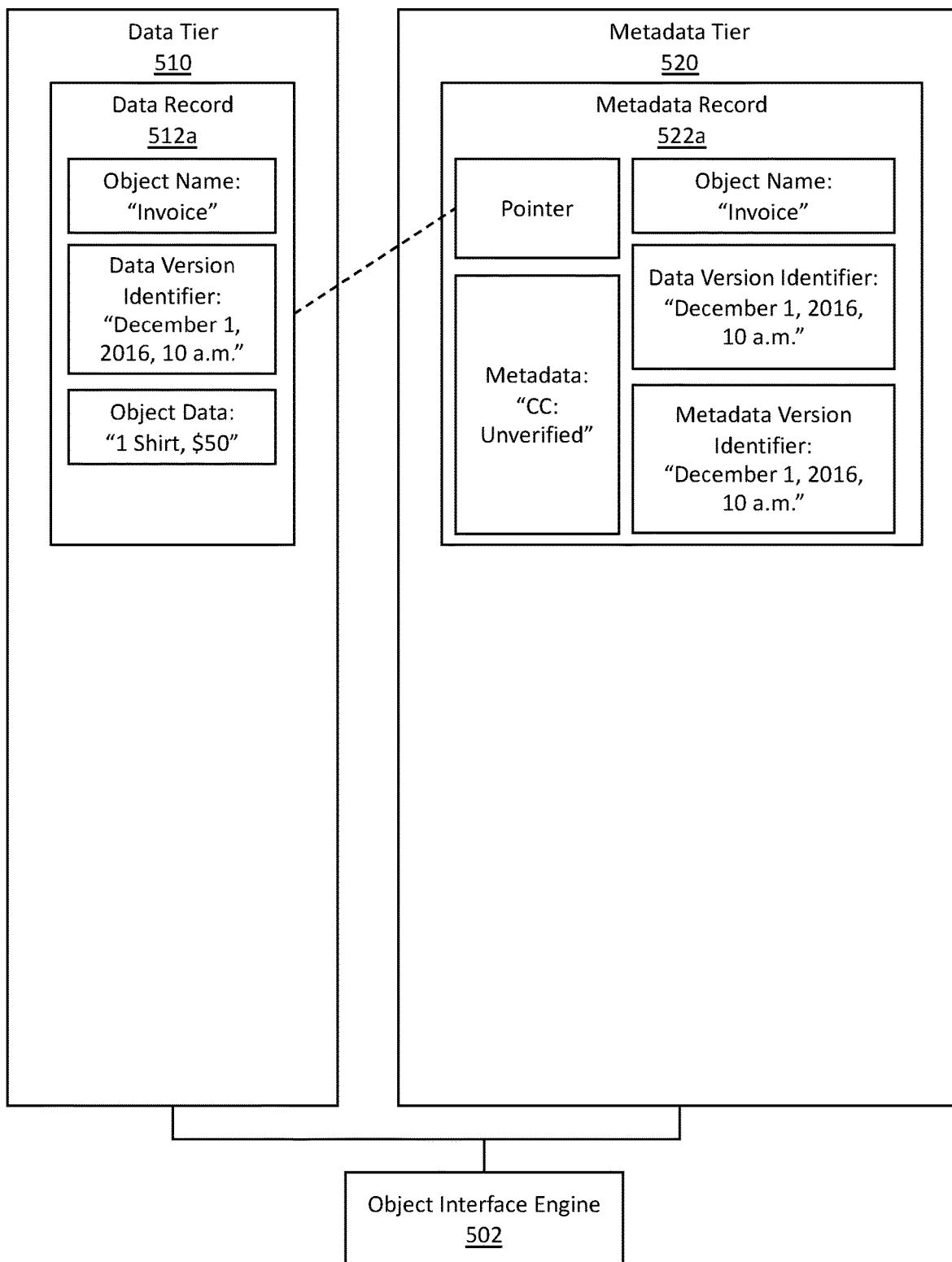
FIGS. 5A-C illustrate examples of a storage system that maintains immutable data and mutable metadata, in accordance with one or more embodiments.
Figure 5B:
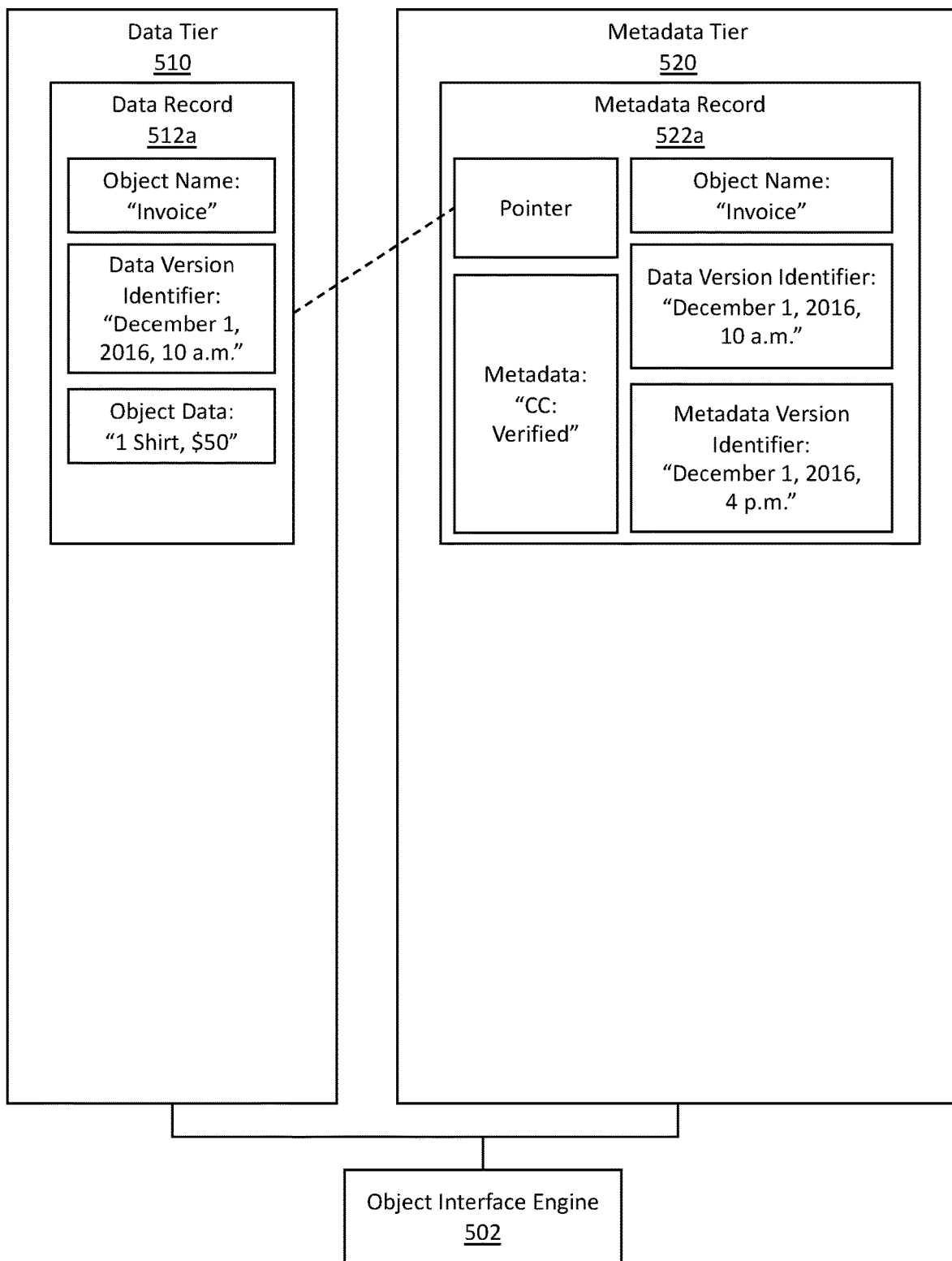
Figure 5C:
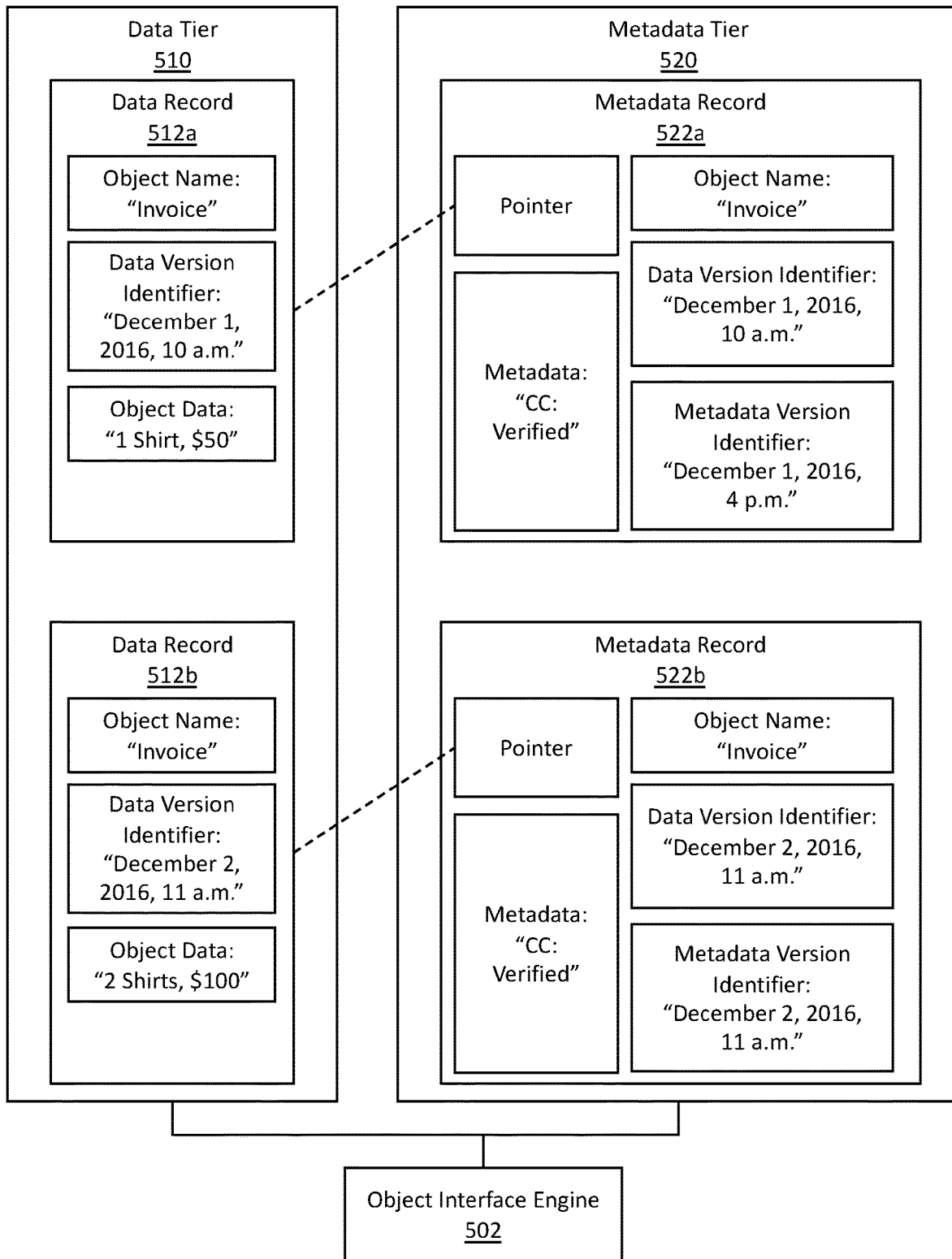

FIGS. 5A-C illustrate examples of a storage system that maintains immutable data and mutable metadata, in accordance with one or more embodiments.

As an example, a customer submits a purchase order via a website. The customer orders one shirt, costing a total of $50. Based on the purchase order, a request to modify an object is sent to a storage system. The request is to create a new object associated with the object name, "Invoice." The request includes a "PUT" command. The request includes the object data of the object, "1 Shirt, $50."

Referring to FIG. 5A, the storage system includes a data tier 510 and a metadata tier 520. An object interface engine 502 receives the request to modify an object. The object interface engine 502 identifies the "PUT" command within the request. Based on the "PUT" command, the object interface engine 502 determines that the request is to modify the data of the object.

The object interface engine 502 generates a new data record 512a for the object. Based on the request, the object interface engine 502 determines that an object name to be stored in the data record 512a is "Invoice." Additionally, based on a clock associated with storage system, the current time is "Dec. 1, 2016, 10 a.m." The object interface engine 502 determines that a data version identifier to be stored in the data record 512a is "Dec. 1, 2016, 10 a.m."

The object interface engine 502 determines the new data to be stored in the data record 512a. The object interface engine 502 obtains the new data from the request. The new data is "1 Shirt, $50."

The object interface engine 502 stores the data record 512a into the data tier 510 of the storage system. The data record 512a includes (a) the object name, "Invoice"; (b) the data version identifier, "Dec. 1, 2016, 10 a.m."; and (c) the object data, "1 Shirt, $50."

Additionally, the object interface engine 502 generates a new metadata record 522a for the object. The metadata record 522a has the same object name and data version identifier as the corresponding data record 512a. Additionally, based on a clock associated with storage system, the current time is "Dec. 1, 2016, 10 a.m." The object interface engine 502 determines that a metadata version identifier to be stored in the metadata record 522a is "Dec. 1, 2016, 10 a.m."

The object interface engine 502 determines the new metadata to be stored in the metadata record 522a. The object interface engine 502 determines that the credit card used on the purchase order is not yet verified. The metadata, "CC: Unverified," is to be stored in the metadata record 522a.

The object interface engine 502 determines a pointer to be stored in the metadata record 522a. The pointer is a reference to the corresponding data record 512a.

The object interface engine 502 stores the metadata record 522a into the metadata tier 520 of the storage system. The metadata record 522a includes (a) the object name, "Invoice"; (b) the data version identifier, "Dec. 1, 2016, 10 a.m."; (c) the metadata version identifier, "Dec. 1, 2016, 10 a.m."; (d) the metadata, "CC: Unverified"; and (e) the pointer to the data record 512a.

Subsequently, an application successfully verifies the credit card used on the purchase order. The application submits a request to modify the object to the storage system. The request is to modify the metadata of the object named, "Invoice." The request includes an "UPDATE" command. The request includes the new metadata of the object, "CC: Verified."

Referring to FIG. 5B, the object interface engine 502 receives the request to modify an object. The object interface engine 502 identifies the "UPDATE" command within the request. Based on the "UPDATE" command, the object interface engine 502 determines that the request is to modify the metadata of the object.

The object interface engine 502 identifies a current metadata record 522a of the object. The object interface engine 502 identifies the metadata record 522a as the only metadata record including the object name, "Invoice." The metadata record 522a may be referred to as a "current metadata record" of the object.

The object interface engine 502 determines a new metadata version identifier for the metadata record 522a. Based on a clock associated with storage system, the current time is "Dec. 1, 2016, 4 p.m." The object interface engine 502 determines that a metadata version identifier to be stored in the metadata record 522a is "Dec. 1, 2016, 4 p.m."

The object interface engine 502 determines the new metadata to be stored in the metadata record 522a. The object interface engine 502 obtains the new metadata from the request. The new metadata is "CC: Verified."

The object interface engine 502 overwrites the metadata record 522a using the new metadata. The metadata record 522a now includes (a) the object name, "Invoice"; (b) the data version identifier, "Dec. 1, 2016, 10 a.m."; (c) the metadata version identifier, "Dec. 1, 2016, 4 p.m."; (d) the metadata, "CC: Verified"; and (e) the pointer to the data record 512a.

Subsequently, the customer modifies the purchase order via the website. The customer modifies the purchase order to purchase two shirts, costing a total of $100. Based on the modification to the purchase order, a request to modify an object is sent to the storage system. The request is to modify the data of an object named, "Invoice." The request includes a "PUT" command. The request includes a new version of the object data of the object, "2 Shirts, $100."

Referring to FIG. 5C, the object interface engine 502 receives the request to modify the object. The object interface engine 502 identifies the "PUT" command within the request. Based on the "PUT" command, the object interface engine 502 determines that the request is to modify the data of the object.

The object interface engine 502 generates a new data record 512b for the object. Based on the request, the object interface engine 502 determines that an object name to be stored in the data record 512b is "Invoice." Additionally, based on a clock associated with storage system, the current time is "Dec. 2, 2016, 11 a.m." The object interface engine 502 determines that a data version identifier to be stored in the data record 522a is "Dec. 2, 2016, 11 a.m."

The object interface engine 502 determines the new data to be stored in the data record 512b. The object interface engine 502 obtains the new data from the request. The new data is "2 Shirts, $100."

The object interface engine 502 stores the data record 512b into the data tier 510 of the storage system. The data record 512b includes (a) the object name, "Invoice"; (b) the data version identifier, "Dec. 2, 2016, 11 a.m."; and (c) the object data, "2 Shirts, $100."

Additionally, the object interface engine 502 generates a new metadata record 522b for the object. The metadata record 522b has the same object name and data version identifier as the corresponding data record 512b. Additionally, based on a clock associated with storage system, the current time is "Dec. 2, 2016, 11 a.m." The object interface engine 502 determines that a metadata version identifier to be stored in the metadata record 522b is "Dec. 2, 2016, 11 a.m."

The object interface engine 502 determines the new metadata to be stored in the metadata record 522b. The object interface engine 502 determines that the verification status of the credit card based on the metadata record 522a. The object interface engine 502 copies the metadata, "CC: Verified," from the metadata record 522a.

The object interface engine 502 determines a pointer to be stored in the metadata record 522b. The pointer is a reference to the corresponding data record 512b.

The object interface engine 502 stores the metadata record 522b into the metadata tier 520 of the storage system. The metadata record 522b includes (a) the object name, "Invoice"; (b) the data version identifier, "Dec. 2, 2016, 11 a.m."; (c) the metadata version identifier, "Dec. 2, 2016, 11 a.m."; (d) the metadata, "CC: Verified"; and (e) the pointer to the data record 512b.

As illustrated in the above examples, the data stored in the data records 512a-b is immutable. The metadata stored in the metadata records 522a-b is mutable. Each data record corresponds to a version of object data of an object. Each metadata record corresponds to a version of object data of an object. There is a one-to-one mapping between data records 512a-b and metadata records 522a-b.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
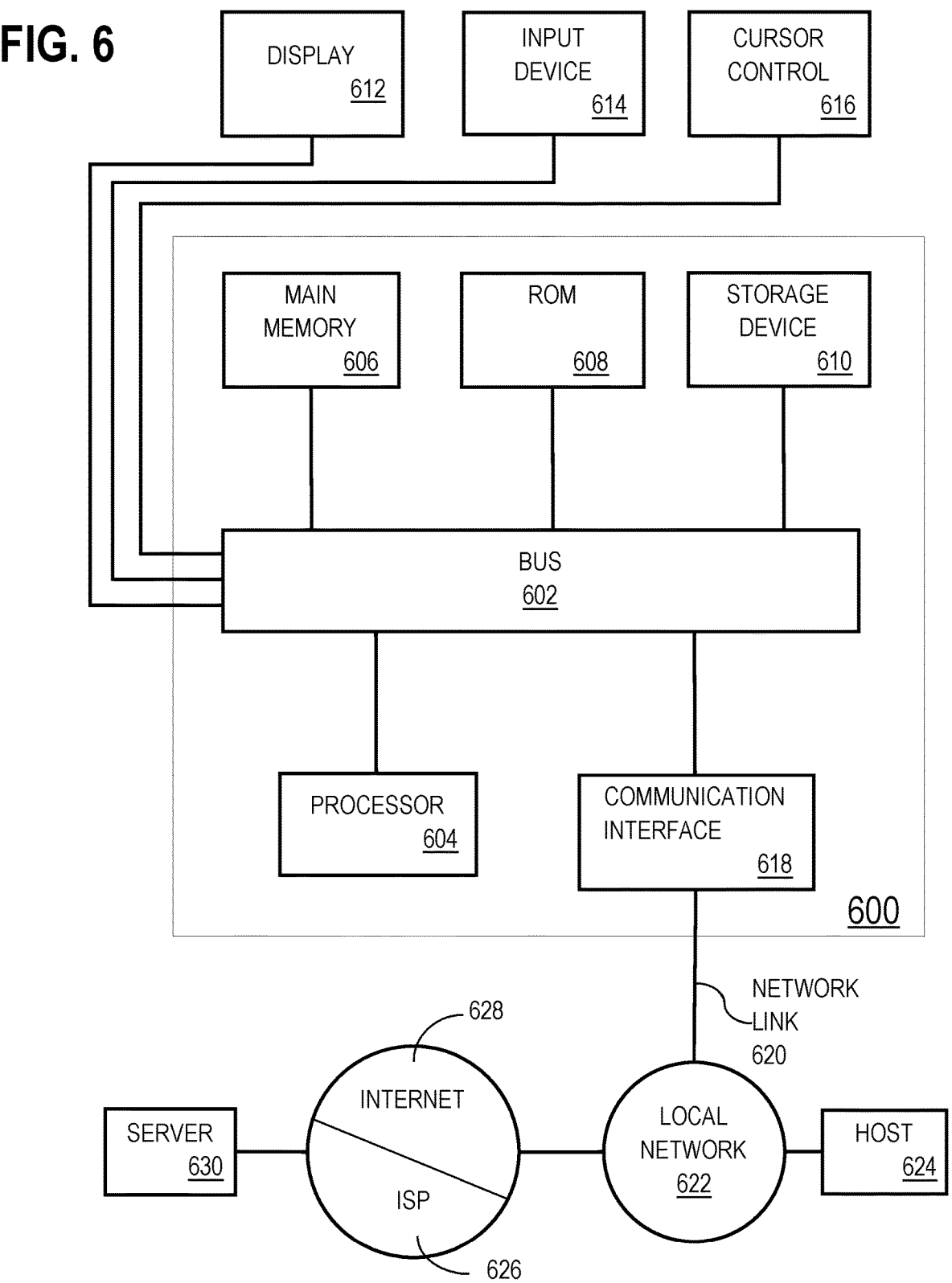
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other e 120 magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions, which when executed by one or more hardware processors, cause performance of operations comprising:
    maintaining, in a storage system, a plurality of immutable data records in association with a plurality of mutable metadata records;
    receiving a first request to modify a first object stored in the storage system;
    wherein the first object is represented by (a) a first immutable data record, of the plurality of immutable data records, and (b) a first mutable metadata record, of the plurality of mutable metadata records;
    wherein data associated with the first object is stored in the first immutable data record, and metadata associated with the first object is stored in the first mutable metadata record;
    determining whether the first request includes (a) modifying data associated with the first object or (b) modifying metadata associated with the first object without modifying any data associated with the first object;
    responsive to determining that the first request includes modifying data associated with the first object:
        modifying data associated with the first object at least by:
            (a) adding a second immutable data record, for the first object, to the plurality of immutable data records;
            (b) adding a second mutable metadata record, for the first object, to the plurality of mutable metadata records;
            (c) storing new metadata, corresponding to the first object, into the second mutable metadata record;
            (d) storing new object data, corresponding to the first object, into the second immutable data record;
        wherein, subsequent to modifying the first object, the first object is represented by (a) the second immutable data record, of the particular plurality of immutable data records, and (b) the second mutable metadata record, of the particular plurality of mutable metadata records;
    receiving a second request to modify a second object stored in the storage system;
    wherein the second object is represented by (a) a third immutable data record, of the plurality of immutable data records, and (b) a third mutable metadata record, of the plurality of mutable metadata records;
    wherein data associated with the second object is stored in the third immutable data record, and metadata associated with the second object is stored in the third mutable metadata record;
    determining whether the second request includes (a) modifying data associated with the second object or (b) modifying metadata associated with the second object without modifying any data associated with the second object;
    responsive to determining that the second request includes modifying metadata associated with the second object without modifying any data associated with the second object:
        modifying metadata associated with the second object without modifying any data associated with the second object at least by:
            (a) identifying the third mutable metadata record associated with the second object; and
            (b) overwriting existing metadata with new metadata in the third mutable metadata record, without adding any immutable data record, for the second object, to the plurality of immutable data records, and without adding any mutable metadata record, for the second object, to the plurality of mutable metadata records;
    wherein, subsequent to modifying the second object, the second object remains represented by (a) the third immutable data record, of the plurality of immutable data records, and (b) the third mutable metadata record, of the plurality of mutable metadata records.

2. The medium of claim 1, wherein no data records or metadata records are generated responsive to determining that the second request includes modifying metadata associated with the second object without modifying any data associated with the second object.

3. The medium of claim 1, wherein the storage system maintains a one-to-one mapping between the plurality of immutable data records and the plurality of mutable metadata records.

4. The medium of claim 1, wherein the first immutable data record is associated with a data version identifier, and the first mutable metadata record is associated with a metadata version identifier.

5. The medium of claim 4, wherein the data version identifier comprises a representation of a time at which the first immutable data record was generated.

6. The medium of claim 5, wherein the representation of the time comprises:

an epoch identifying a time period in which a system clock remained unchanged;
a physical time determined based on the system clock; and
a logical time that indicates an ordering of one or more objects associated with a same epoch and a same physical time.

7. The medium of claim 1, wherein:
the first mutable metadata record is associated with a first metadata version identifier and a second metadata version identifier; and
the operations further comprise:
performing one of:
responsive to determining that the second request is a user request, updating both the first metadata version identifier and the second metadata version identifier; and
responsive to determining that the second request is a system request, updating the first metadata version identifier, without updating the second metadata version identifier.

8. The medium of claim 1, wherein the first mutable metadata record includes a first pointer to the first immutable data record and the second mutable metadata record includes a second pointer to the second immutable data record.

9. The medium of claim 1, wherein determining whether the first request includes (a) modifying data associated with the first object or (b) modifying metadata associated with the first object without modifying any data associated with the first object is based on a command included in the first request.

10. The medium of claim 1, wherein:
no data records or metadata records are generated responsive to determining that the second request includes modifying metadata associated with the second object without modifying any data associated with the second object;
the storage system maintains a one-to-one mapping between the plurality of immutable data records and the plurality of mutable metadata records;
determining whether the first request includes (a) modifying data associated with the first object or (b) modifying metadata associated with the first object without modifying any data associated with the first object is based on a command included in the first request;
the first immutable data record is associated with a data version identifier;
the data version identifier comprises a representation of a time at which the first data record was generated, and the representation of the time comprises:
an epoch identifying a time period in which a system clock remained unchanged;
a physical time determined based on the system clock; and
a logical time that indicates an ordering of one or more objects associated with a same epoch and a same physical time; and
the first mutable metadata record is associated with a first metadata version identifier and a second metadata version identifier; and
the operations further comprise:
performing one of:
responsive to determining that the second request is a user request, updating both the first metadata version identifier and the second metadata version identifier; and
responsive to determining that the second request is a system request, updating the first metadata version identifier, without updating the second metadata version identifier.

11. A method, comprising:
maintaining, in a storage system, a plurality of immutable data records in association with a plurality of mutable metadata records;
receiving a first request to modify a first object stored in the storage system;
wherein the first object is represented by (a) a first immutable data record, of the plurality of immutable data records, and (b) a first mutable metadata record, of the plurality of mutable metadata records;
wherein data associated with the first object is stored in the first immutable data record, and metadata associated with the first object is stored in the first mutable metadata record;
determining whether the first request includes (a) modifying data associated with the first object or (b) modifying metadata associated with the first object without modifying any data associated with the first object;
responsive to determining that the first request includes modifying data associated with the first object:
modifying data associated with the first object at least by:
(a) adding a second immutable data record, for the first object, to the plurality of immutable data records;
(b) adding a second mutable metadata record, for the first object, to the plurality of mutable metadata records;
(c) storing new metadata, corresponding to the first object, into the second mutable metadata record;
(d) storing new object data, corresponding to the first object, into the second immutable data record;
wherein, subsequent to modifying the first object, the first object is represented by (a) the second immutable data record, of the particular plurality of immutable data records, and (b) the second mutable metadata record, of the particular plurality of mutable metadata records;
receiving a second request to modify a second object stored in the storage system;
wherein the second object is represented by (a) a third immutable data record, of the plurality of immutable data records, and (b) a third mutable metadata record, of the plurality of mutable metadata records;
wherein data associated with the second object is stored in the third immutable data record, and metadata associated with the second object is stored in the third mutable metadata record;
determining whether the second request includes (a) modifying data associated with the second object or (b) modifying metadata associated with the second object without modifying any data associated with the second object;
responsive to determining that the second request includes modifying metadata associated with the second object without modifying any data associated with the second object:
modifying metadata associated with the second object without modifying any data associated with the second object at least by:
(a) identifying the third mutable metadata record associated with the second object; and
(b) overwriting existing metadata with new metadata in the third mutable metadata record, without adding any immutable data record, for the second object, to the plurality of immutable data records, and without adding any mutable metadata record, for the second object, to the plurality of mutable metadata records;

wherein, subsequent to modifying the second object, the second object remains represented by (a) the third immutable data record, of the plurality of immutable data records, and (b) the third mutable metadata record, of the plurality of mutable metadata records;

wherein the method is performed by at least one device including a hardware processor.

12. The method of claim 11, wherein no data records or metadata records are generated responsive to determining that the second request includes modifying metadata associated with the second object without modifying any data associated with the second object.

13. The method of claim 11, wherein the storage system maintains a one-to-one mapping between the plurality of immutable data records and the plurality of mutable metadata records.

14. The method of claim 11, wherein the first immutable data record is associated with a data version identifier, and the first mutable metadata record is associated with a metadata version identifier.

15. The method of claim 14, wherein:
the data version identifier comprises a representation of a time at which the first immutable data record was generated; and
the representation of the time comprises:
an epoch identifying a time period in which a system clock remained unchanged;
a physical time determined based on the system clock; and
a logical time that indicates an ordering of one or more objects associated with a same epoch and a same physical time.

16. A system, comprising:
at least one device including a hardware processor; and
the system being configured to perform operations comprising:
maintaining, in a storage system, a plurality of immutable data records in association with a plurality of mutable metadata records;
receiving a first request to modify a first object stored in the storage system;
wherein the first object is represented by (a) a first immutable data record, of the plurality of immutable data records, and (b) a first mutable metadata record, of the plurality of mutable metadata records;
wherein data associated with the first object is stored in the first immutable data record, and metadata associated with the first object is stored in the first mutable metadata record;
determining whether the first request includes (a) modifying data associated with the first object or (b) modifying metadata associated with the first object without modifying any data associated with the first object;
responsive to determining that the first request includes modifying data associated with the first object:
modifying data associated with the first object at least by:
(a) adding a second immutable data record, for the first object, to the plurality of immutable data records;
(b) adding a second mutable metadata record, for the first object, to the plurality of mutable metadata records;
(c) storing new metadata, corresponding to the first object, into the second mutable metadata record;

(d) storing new object data, corresponding to the first object, into the second immutable data record;

wherein, subsequent to modifying the first object, the first object is represented by (a) the second immutable data record, of the particular plurality of immutable data records, and (b) the second mutable metadata record, of the particular plurality of mutable metadata records;

receiving a second request to modify a second object stored in the storage system;

wherein the second object is represented by (a) a third immutable data record, of the plurality of immutable data records, and (b) a third mutable metadata record, of the plurality of mutable metadata records;

wherein data associated with the second object is stored in the third immutable data record, and metadata associated with the second object is stored in the third mutable metadata record;

determining whether the second request includes (a) modifying data associated with the second object or (b) modifying metadata associated with the second object without modifying any data associated with the second object;

responsive to determining that the second request includes modifying metadata associated with the second object without modifying any data associated with the second object:
modifying metadata associated with the second object without modifying any data associated with the second object at least by:
(a) identifying the third mutable metadata record associated with the second object; and
(b) overwriting existing metadata with new metadata in the third mutable metadata record, without adding any immutable data record, for the second object, to the plurality of immutable data records, and without adding any mutable metadata record, for the second object, to the plurality of mutable metadata records;

wherein, subsequent to modifying the second object, the second object remains represented by (a) the third immutable data record, of the plurality of immutable data records, and (b) the third mutable metadata record, of the plurality of mutable metadata records.

17. The system of claim 16, wherein no data records or metadata records are generated responsive to determining that the second request includes modifying metadata associated with the second object without modifying any data associated with the second object.

18. The system of claim 16, wherein the storage system maintains a one-to-one mapping between the plurality of immutable data records and the plurality of mutable metadata records.

19. The system of claim 16, wherein the first immutable data record is associated with a data version identifier, and the first mutable metadata record is associated with a metadata version identifier.

20. The system of claim 19, wherein:
the data version identifier comprises a representation of a time at which the first immutable data record was generated; and
the representation of the time comprises:
an epoch identifying a time period in which a system clock remained unchanged;
a physical time determined based on the system clock; and a logical time that indicates an ordering of one or more objects associated with a same epoch and a same physical time.

* * * * *